Patented Mar. 10, 1942

2,276,149

UNITED STATES PATENT OFFICE 2,276,149

ALDEHYDO QUATERNARY AMMONIUM COMPOUNDS

Louis H. Bock, Glenside, and Alva L. Houk, Philadelphia, Pa., assignors to Röhm & Haas Company, Philadelphia, Pa.

No Drawing. Application August 2, 1940, Serial No. 350,134

11 Claims. (Cl. 260—584)

This invention relates to aldehydo quaternary ammonium compounds and to a method for their preparation. These compounds are of the general formula

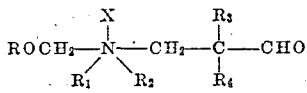

wherein R is an aliphatic, arylaliphatic, or hydroarylaliphatic group having at least one hydrogen on the carbon atom attached to the ether oxygen atom, $R_1$ and $R_2$ are members of the class consisting of aliphatic groups and cycloaliphatic hydrocarbon groups when taken singly and when taken together divalent saturated aliphatic radicals which jointly with the nitrogen form a heterocycle, $R_3$ is a member of the group consisting of hydrogen and alkyl groups, $R_4$ is a member of the class consisting of hydrogen and aliphatic hydrocarbon groups, and X is a halogen.

The compounds of the formula have been found peculiarly effective in reacting with cellulose to render it resistant to water. Cellulose fabrics impregnated and heated with one of these compounds becomes stable in dimensions, having little tendency to shrink. By the use of compounds having long hydrocarbon chains cellulose is also rendered water-proof. The value of the compounds for such uses is due in part to the presence of several reactive groups in the molecule and to the ease with which they react with cellulose. These compounds also possess germicidal, insecticidal, and fungicidal value. Those having long chained substituents exhibit surface activity which renders them useful for wetting, emulsifying, cleansing, dispersing, etc.

The aldehydo quaternary ammonium compounds are obtained by reacting an α-disubstituted aminomethyl aldehyde of the formula

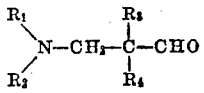

with a halomethyl ether of a primary or secondary alcohol of the formula $ROCH_2X$, where the symbols have the same significance as above.

The α-disubstituted aminomethyl aldehydes may be prepared from aliphatic aldehydes having a hydrogen on the alpha carbon atom by reaction with formaldehyde and a strongly basic, non-aromatic secondary amine (Cf. Ber. 65B, 378 (1932)). Typical aldehydes which may be thus reacted include acetaldehyde, propionaldehyde, isobutyraldehyde, valeraldehyde, 2-ethylhexylaldehyde, heptaldehyde, dodecylaldehyde, octadecylaldehyde, 9,10-octadecenylaldehyde, hexahydrobenzaldehyde, etc. Amines which are used to form the intermediate are strongly basic, non-aromatic secondary amines, including dimethylamine, diethylamine, methyl cyclohexylamine, dibutylamine, diisobutylamine, the diamylamines, methyl caprylamine, diallylamine, dicyclohexylamine, etc. or morpholine, piperidine, pyrrolidine, etc., the latter class yielding amino groups in a heterocycle.

The halomethyl ethers are obtained by reaction of a primary or secondary alcohol with formaldehyde and a hydrohalide such as hydrogen chloride or hydrogen bromide. A convenient method for the preparation of the halomethyl ethers is described in Example 1 of U. S. Patent No. 2,084,125. Typical alcohols, useful in the preparation of these ethers, include methyl, ethyl, propyl, butyl, isobutyl, octyl, decyl, dodecyl, cetyl, octadecyl, 9,10-octadecenyl, ethoxyethyl, butoxyethyl, allyl, methallyl, undecenyl, capryl, dicapryl, benzyl, hexahydrobenzyl, etc. The group R in the compound $ROCH_2X$ may, therefore, be straight-chained or branched, saturated or unsaturated, but in all cases it possesses at least one hydrogen atom on the carbon which is connected to the ether oxygen atom. The preferred derivatives are obtained from primary alcohols and the expression "primary aliphatic group" is used to designate the compounds so derived and which have a —$CH_2$— group in juxtaposition to the ether oxygen.

The α-disubstituted aminomethyl aldehyde and halomethyl ether are mixed with or without a solvent. The reaction is exothermic and for this reason it is often desirable, particularly with ethers of small molecular size, to cool the reaction mixture at the start. It is then maintained between 0° C. and about 60° C. until the reaction is substantially complete.

The following examples illustrate the preparation of the complex quaternary compounds of this invention.

*Example 1*

A flask containing 131 parts of dimethylaminoneopentanal was placed in an ice bath and 94 parts of ethyl chloromethyl ether slowly added with stirring. The temperature during this addition remained below 40° C. The mixture was then stirred for thirty minutes with the temperature maintained at 40° C. The resulting product, ethoxymethyl dimethyl β-methyl-β-formyl-propyl ammonium chloride, was a thick paste which was easily soluble in water.

In place of ethyl chloromethyl ether there may be reacted with similar ease a halomethyl ether of any other lower alcohol such as isopropyl, isobutyl, butyl, etc. The butyl derivative is of particular interest in the stabilization of textile fabrics.

*Example 2*

To 100 parts of dimethylaminoneopentanal there was slowly added with stirring 138 parts of 2-ethyl hexyl chloromethyl ether. The temperature during the reaction was maintained at 40-50° C. The reaction product, 2-ethylhexoxymethyl dimethyl β-formyl-β-methyl-propyl ammonium chloride, in the form of a very stiff paste was water-soluble.

*Example 3*

To 100 parts of diethylaminoneopentanal was slowly added with stirring 182 parts of dodecyloxymethyl bromide. The temperature was maintained below 50° C. On cooling, a soft, waxy material was obtained. It gave a clear, soapy solution in water and corresponded to dodecyloxymethyl dimethyl β-methyl-β-formyl-propyl ammonium bromide.

*Example 4*

To 19 parts of dimethylaminoneopentanal was slowly added, with cooling, 18 parts of methallyl chloromethyl ether. The resulting product, methallyloxymethyl dimethyl β-methyl-β-formyl-propyl ammonium chloride, was a stiff paste which dissolved in water to give a slightly turbid solution.

*Example 5*

To 19 parts of dimethylaminoneopentanal was added 22.6 parts of benzyl chloromethyl ether. Then the reaction mixture was stirred for a short time. The product, benzyloxymethyl dimethyl β-methyl-β-formyl-propyl ammonium chloride, was a very stiff paste which gave a slightly turbid solution in water.

*Example 6*

To 102 parts of β-dimethylaminoisobutanal was added slowly with stirring approximately 94 parts of ethyl chloromethyl ether. The reaction proceeded rapidly. The reaction product, ethoxymethyl dimethyl β-formyl-propyl ammonium chloride, was a syrup which was soluble in water.

*Example 7*

To a solution of 129 parts of dimethylaminoneopentanal in 500 parts of benzene was added 206 parts of decyl chloromethyl ether. The temperature was kept below 50° C. during the addition. The mixture was stirred for 16 hours with the temperature maintained at 50° C. Water was then added and the benzene was removed under low pressure at 50° C. The product, decyloxymethyl dimethyl β-methyl-β-formyl-propyl ammonium chloride, was adjusted to a 50% aqueous solution which was a clear, slightly viscous syrup.

*Example 8*

To 71 parts of octadecyl chloromethyl ether was added with stirring 26 parts of dimethylaminoneopentanal. The reaction mixture was stirred and maintained at 40° C. for two hours. The product, octadecyloxymethyl dimethyl β-methyl-β-formyl-propyl ammonium chloride, was a stiff paste, wax-like in nature. It dissolved in water to form a soapy solution.

*Example 9*

A mixture was made with 30 parts of the aldehydo-amine resulting from the interaction of dimethylamine, formaldehyde and octadecylaldehyde and with 8 parts of butyl chloromethyl ether. The temperature of the mixture was raised to 50° C. and maintained at this point for three hours while the mixture was stirred. The resulting product was a waxy, soap-like solid, which gave an opalescent solution in water. This product, butoxymethyl dimethyl β-formyl-octadecyl ammonium chloride, has the structure

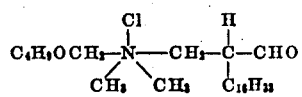

Other typical compounds of the type are

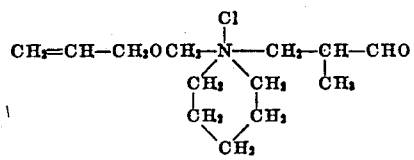

allyloxymethyl β-formyl-propyl piperidinium chloride;

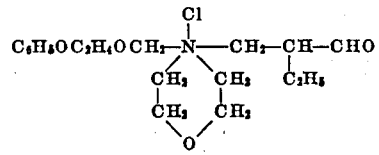

phenoxyethoxymethyl β-formyl-butyl morpholinium chloride;

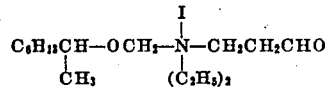

capryloxymethyl β-formyl-ethyl diethyl ammonium iodide;

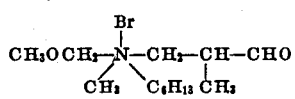

methoxymethyl methyl cyclohexyl β-formyl-propyl ammonium bromide.

We claim:

1. Quaternary ammonium compounds of the general formula

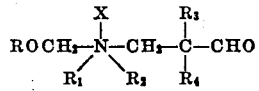

wherein R is a group selected from the class consisting of aliphatic, arylaliphatic, and hydroarylaliphatic groups having at least one hydrogen on the carbon atom attached to the ether oxygen atom, $R_1$ and $R_2$ are members of the class consisting of aliphatic and cycloaliphatic hydrocarbon groups when taken individually and when taken together divalent saturated aliphatic radicals which jointly with the nitrogen form a heterocycle, $R_3$ is a member of the class consisting of hydrogen and lower alkyl groups, $R_4$ is a member of the class consisting of hydrogen and aliphatic hydrocarbon groups, and X is a halogen.

2. A quaternary ammonium compound of the formula

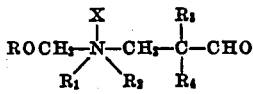

wherein R is a primary aliphatic hydrocarbon group, R₁ and R₂ are members of the class consisting of aliphatic and cycloaliphatic hydrocarbon groups when taken individually and when taken together divalent saturated aliphatic radicals which jointly with the nitrogen form a heterocycle, R₃ is a member of the class consisting of hydrogen and lower alkyl groups, R₄ is a member of the class consisting of hydrogen and aliphatic hydrocarbon groups, and X is a halogen.

3. A quaternary ammonium compound of the formula

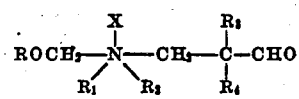

wherein R is a primary aliphatic hydrocarbon group, R₁ and R₂ are alkyl groups, R₃ is a member of the class consisting of hydrogen and lower alkyl groups, R₄ is a member of the class consisting of hydrogen and aliphatic hydrocarbon groups, and X is a halogen.

4. A quaternary ammonium compound of the formula

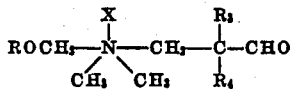

wherein R is an aliphatic hydrocarbon group having at least one hydrogen on the carbon atom attached to the ether oxygen atom, R₃ is a member of the class consisting of hydrogen and lower alkyl groups, R₄ is an aliphatic hydrocarbon group and X is a halogen.

5. A quaternary ammonium compound of the formula

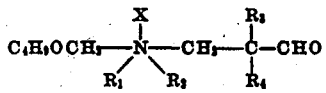

wherein R₁ and R₂ are alkyl groups, R₃ is a member of the class consisting of hydrogen and lower alkyl groups, R₄ is an aliphatic hydrocarbon group, and X is a halogen.

6. A quaternary ammonium compound of the formula

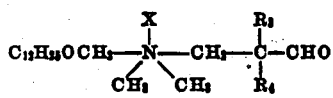

wherein R₃ is a member of the class consisting of hydrogen and lower alkyl groups, R₄ is an aliphatic hydrocarbon group, and X is a halogen.

7. The compound

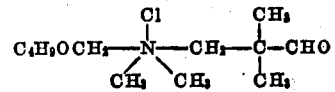

8. The compound

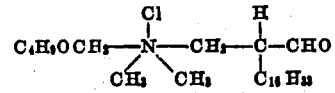

9. The compound

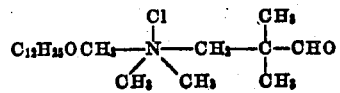

10. A method of preparing aldehydo quaternary ammonium compounds which comprises reacting between 0° C. and about 60° C. a compound of the formula

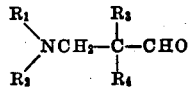

wherein R₁ and R₂ represent members of the group consisting of aliphatic groups and cycloaliphatic hydrocarbon groups when taken individually and when taken together divalent saturated aliphatic radicals which jointly with the nitrogen form a heterocycle, R₃ is a member of the group consisting of hydrogen and lower alkyl groups, and R₄ is a member of the class consisting of hydrogen and aliphatic hydrocarbon groups with a halomethyl ether of the formula ROCH₂X wherein R is a group selected from the group consisting of aliphatic, arylaliphatic, and hydroarylaliphatic groups having at least one hydrogen on the carbon atom attached to the ether oxygen atom and X is a halogen.

11. A method of preparing aldehydo quaternary ammonium compounds which comprises reacting between 0° C. and about 60° C. a compound of the formula

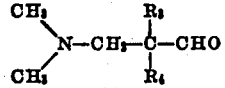

wherein R₃ is a member of the class consisting of hydrogen and lower alkyl groups and R₄ is an aliphatic hydrocarbon group with a halomethyl ether of the formula ROCH₂X wherein R is a primary aliphatic hydrocarbon group and X is a halogen.

LOUIS H. BOCK.
ALVA L. HOUK.